United States Patent [19]

Wooler

[11] 4,110,397

[45] Aug. 29, 1978

[54] COMPOSITE BODIES OR SHEETS

[75] Inventor: Alan Metcalf Wooler, Manchester, England

[73] Assignee: Imperial Chemical Industries Limited, Great Britain

[21] Appl. No.: 781,416

[22] Filed: Mar. 25, 1977

[30] Foreign Application Priority Data

Apr. 6, 1976 [GB] United Kingdom ............... 13967/76

[51] Int. Cl.$^2$ .............................................. B29C 1/04
[52] U.S. Cl. .................................... 264/338; 264/109; 264/122
[58] Field of Search ................ 264/338, 109, 122, 300

[56] References Cited

U.S. PATENT DOCUMENTS

| 2,033,411 | 3/1936 | Carson | 264/338 |
| 2,772,141 | 11/1956 | Dunlap | 264/338 |
| 3,174,940 | 3/1965 | Lacoste | 264/109 |
| 3,440,189 | 4/1969 | Sharp | 264/109 |
| 3,542,629 | 11/1970 | Burkner | 264/109 |

Primary Examiner—Jeffery R. Thurlow
Attorney, Agent, or Firm—Cushman, Darby & Cushman

[57] ABSTRACT

An improvement is provided in moulding processes for composite bodies or sheets, especially chipboard, made from mouldable compositions in which an isocyanate-based binding agent is used, the improvement being the provision of a metallic soap at the interface of the composition and mould surface to assist release.

14 Claims, No Drawings

COMPOSITE BODIES OR SHEETS

This invention relates to a process for the manufacture of composite bodies or sheets.

In the manufacture of composite bodies or sheets by shaping in a mould or between mould surfaces a mixture of a filler material and an isocyanate-based binding agent, difficulty is often experienced in releasing the sheet or body from the mould because of adhesion between the binder and mould surface or surfaces.

The problem is exacerbated where it is not practicable to apply a release agent to the mould surface or surfaces, for instance, in the manufacture of composite sheets like chipboard.

Chipboards are commonly prepared by hot pressing a mass of wood chips, wood fibres and other lignocellulosic material in admixture with a binding agent. The platens of the chipboard press are usually made of steel and maintained at a temperature of between 140° and 230° C. The boards are made near continuously so that there is limited access to the platens making the application of release agents to the platens themselves practically impossible.

The binding agent normally used in chipboard manufacture is a synthetic resin glue, such as a solution of a urea-formaldehyde or phenol formaldehyde resin but the advantage of using an isocyanate-based binding agent, which gives products of comparable tensile strength when used in much less quantity, has long been appreciated. Unfortunately considerable difficulty has been experienced in releasing the board made with an isocyanate-based binder from the press platens. The inclusion of a wax in the chip/binder mixture is adequate to prevent adhesion of a urea-formaldehyde or phenol-formaldehyde bonded chipboard but it is ineffective when an isocyanate-based binder is used.

The conventional release agents which include oils, wax polishes silicones and polytetrafluoroethylene have proved unsatisfactory as have the specialised urethane release agents including those used in structural foam applications.

One technique used to overcome the release problem is to face a core of isocyanate bound wood chips with layers of chips separately treated with a phenol-formaldehyde resin. Another is to face the chipboard with paper but this has obvious disadvantages.

According to the present invention we provide a process for the manufacture of composite bodies or sheets which comprises shaping in a mould or between mould surfaces a mixture of a filler material and an isocyanate-based binding agent there being provided at the interface of the mixture and mould surface or surfaces a metallic soap. We also provide composite bodies or sheets made by this process.

The process of our invention is of particular value in the manufacture of chipboard. In this case the filler material is a lignocellulosic material which in admixture with the binding agent is shaped by hot pressing the mixture between mould surfaces in the form of press platens usually at a temperature of between 140° and 230° C.

The term lignocellulosic material includes wood chips, wood fibres, shavings, wood wool, cork and bark, sawdust and like waste products from the woodworking industry, and/or fibres from other natural products which are lignocellulosic, for example bagasse, straw, flax residues and dried rushes, reeds and grasses. Nut shells, for example ground nuts, and hulls from cereal crops, for example rice and oats, are also included. Additionally there may be mixed with the lignocellulosic materials inorganic flake or fibrous material, for example glass fibre, mica and asbestos, and synthetic products such as rubbers and plastics either solid or foamed.

The isocyanate-based binding agent will normally be an organic polyisocyanate either alone or in admixture with another type of binding agent, for example, a synthetic resin glue. It may be applied in liquid form, as a solution in an inert solvent or in the form of an aqueous emulsion.

Organic polyisocyanates which may be used include diisocyanates and higher functionality isocyanates, particularly aromatic polyisocyanates. Mixtures of polyisocyanates may be used of which the crude mixtures of di- and higher functionality polyisocyanates produced by phosgenation of aniline/formaldehyde condensates, known as crude MDI, are especially suitable. The organic polyisocyanates may be isocyanate-ended prepolymers made by reacting an excess of a diisocyanate or higher functionality polyisocyanate with a polyol. The organic polyisocyanate may advantageously be used in the form of an aqueous emulsion by stirring the isocyanate with water in the presence of an emulsifying agent. Isocyanate-based binding agents and emulsions thereof suitable for use in the process of the invention are described in U.S. application Ser. No. 851,385 filed Nov. 14, 1977 and U.S. application Ser. No. 666,244 filed Mar. 12, 1976, now abandoned.

By the term "metallic soap" we mean metal salts of long chain aliphatic or cycloaliphatic acids.

The metal salts include alkali metal salts but are preferably alkaline earth or heavy metal salts. Suitable metals include aluminium, barium, cadmium, lithium, magnesium, lead, zinc, calcium, cobalt, copper, manganese and iron.

As long chain aliphatic or cycloaliphatic acids there may be mentioned naphthenic and hydroxy acids and tall oil and rosin acids but preferably the aliphatic acid is a long chain fatty acid by which we mean saturated or unsaturated monocarboxylic acids containing at least 10 carbon atoms and, in practice, not more than 26 carbon atoms. The most suitable and readily available fatty acids contain between 12 and 18 carbon atoms.

Conveniently the metal soaps are metal stearates of which we would mention aluminium, calcium and zinc stearates and, in particular, iron stearates. Lead, barium, cadmium and copper stearates are less convenient to use because of their toxicity although they may combine to provide anti-fungal activity.

While not wishing to be bound by any particular theory, it is believed that the release efficiency of the metal soap may be related to its melting point. Thus we have observed that when an aluminium or steel mould surface is heated after a mould has been used in the process of the invention some metal soaps melt and flow out very readily showing that they display an affinity towards the mould surface and provide good covering power. On cooling again, hard tenacious but non-brittle and non-powdery coatings are formed. Thus it is believed that the effectiveness of any one particular soap depends on the temperature at which the moulding process is carried out, a soap having a melting point less than the process temperature being more suitable. Obviously the melting point may be adjusted by using mixtures of metal soaps or, where the soap itself is a mixture of polyvalent salts, by varying the metal content of the soap during manufacture.

In the case of chipboard hot pressed between steel platens at a temperature of from 150° to 175° C an iron stearate is the preferred metallic soap.

The process of the invention is readily carried out by thoroughly mixing the filler material with the isocyanate-based binding agent which is then compressed, or otherwise shaped, in a mould or between mould surfaces. Provision of the metallic soap at the interface of the mixture and mould surface or surfaces may be achieved by applying the metallic soap as a powder, as an aqueous suspension or, if the soluble sodium or potassium salts are used, as a solution, or as a finely dispersed gel to the mould surface or surfaces or to the surface of the mixture prior to moulding, or, in some cases, in admixture with the filler/binding agent.

In chipboard manufacture the lignocellulosic material and binder are conveniently mixed by spraying the isocyanate-based binding agent in an aqueous emulsion onto the material while it is being agitated in an enclosed mixer, either of a single batch type or a continuous type. In many cases the chip/binder mixture is sprinkled onto caul plates made of aluminium or steel which serve to carry the "cakes" through into the press. The caul plate and the upper surface of the deposited cake of chips are often first sprayed with water to provide steam which enhances heat transfer into the core during hot pressing and helps balance the final moisture distribution. It would therefore be convenient to use such a water spray as a vehicle for applying a release agent.

In practice, however, it is virtually impossible to provide a continuous film of the release agent at the interface during compression. Thus it is difficult to achieve complete coverage of the caul plate or upper surface of the cake with an economical amount of release agent; during passage of the cake into the heated press the movement frequently disturbs odd chips carrying release agent thereby exposing untreated areas; during closing of the press, movement of individual chips again occurs and slight general overall spreading takes place tending to protect areas free from release agent particularly around the edges of the board; the heat and moisture tend to steam distil release agents from the interface into the core, which possibly explains why oily type agents are found unsuitable; the absorbent nature of the wood chips tends to absorb the release agent; and the roughness of the cake causes excess pressures to develop at high spots tending to displace release agents at such points. Obviously any region temporarily starved of release agent can cause some chips to stick leading to a disfigured product. Unless the stuck chips are removed the effect is magnified.

It is not surprising from a consideration of the above that conventional release agents, such as those referred to earlier, have failed.

Other potential release agents sprayed as water solutions on the caul plate and onto the cake surface prior to pressing have proved of little value. These include solutions of urea, polyvinyl alcohols, polyethylene glycol, sodium silicate, potassium octoate and potassium acetate, the latter being used in an attempt to induce release via isocyanurate formation at the interface. A range of wax and oil emulsions have been found ineffective.

It is an advantage of the present invention therefore that release is assisted when a metallic soap, as hereinbefore defined, is provided at the interface of a mixture of a filler material and isocyanate-based binding agent and a mould surface or surfaces by applying an aqueous solution or dispersion of the metallic soap to the mould surface or surfaces or to the outer surface of the mixture prior to moulding.

While conventional surfactants aid dispersion of the insoluble metallic soaps, they tend to detract from their release efficiency. It has been found however that a soluble metallic soap such as potassium oleate not only aids dispersion of insoluble metallic soaps but contributes to release. Useful aqueous dispersions comprise approximately 5 parts of an insoluble metallic soap, 1 part of a soluble metallic soap and up to 150 parts of water.

Conveniently the dispersion of the insoluble metallic soap can be prepared in situ in a solution of a soluble salt of the same soap. Thus, for instance, a ferric chloride solution is stirred into a solution of a slight molar excess of potassium oleate to produce a fine dispersion of ferric oleate.

For the first moulding operation of a series of operations it is preferable that the mould surface or surfaces are cooled, cleaned and then wiped or sprayed with the metallic soap. Then when raised to operating temperature the soap melts and flows out preconditioning the mould surface. In operation sufficient metallic soap solution or dispersion is sprayed over the upper surface of the filler/binder mixture and caul plate to replace by transfer the tenacious release film on the mould surfaces initially.

The isocyanate-based binding agent may contain various adjuvants, for example fungicides, catalysts to speed reaction of the isocyanate with the lignocellulosic material and/or water, or hydrophobic diluents to slow it down. Hydrophobic waxes or similar products also confer additional water repellent properties on the chipboard and may be added in small amounts without much deterioration in bond strength.

The invention is illustrated but not limited by the following examples in which parts and percentages are by weight unless otherwise stated.

EXAMPLE 1

102 Parts of wood chips dried to a moisture content of 2% were placed in an open tumbler mixer. Whilst being tumbled an aqueous emulsion of an isocyanate-based binding agent, prepared by stirring 4 parts of emulsifiable crude MDI in 8 parts of water with a small amount of a paraffin wax emulsion, was sprayed over the chips by a hand operated spray.

The emulsifiable crude MDI was itself prepared by stirring together and allowing to react 8 parts of methoxy polyethylene glycol (MWt 650) and 100 parts of crude MDI. The methoxypolyethylene glycol reacts with the MDI to form a non-ionic emulsifying agent in situ.

A caul plate 14 inches square was sprayed evenly with 12 gms of a metallic soap dispersion prepared by stirring together 5 parts of aluminium monostearate, 1 part of potassium oleate and 150 parts of water. An 11 inch square cake of the chip/binder mixture was formed on the caul plate by allowing the sprayed chips to fall freely into a frame in such quantity that 1.2 kg sprayed chips occupied an area of 1/10 m$^2$. The upper surface of the cake was sprayed with an equivalent amount of the metallic soap dispersion to that used to spray the caul plate. The cake was pressed at a pressure of approximately 35 kg/cm$^2$ to a thickness of 19 mm at 150° C for 5 minutes, after which the cake was easily released from between the press plates.

EXAMPLES 2-7

The procedure of Example 1 is repeated except that the aluminium monostearate is replaced by the following metallic soaps:

| Example | Metallic soap |
| --- | --- |
| 2 | aluminium distearate |
| 3 | aluminium tristearate |
| 4 | calcium stearate |
| 5 | self-dispersing calcium stearate * |
| 6 | zinc stearate |
| 7 | iron stearate |

* Calcium Stearate AD - water dispersible form marketed by The Durham Chemical Group.

EXAMPLES 8-14

The procedure of Examples 1-7 was repeated except that the dried wood chips were first sprayed while being tumbled with 8 parts of water followed by 4 parts of crude MDI sprayed using a pressure spray and the paraffin wax emulsion.

EXAMPLES 15-21

The procedure of Examples 1-7 was repeated except that the isocyanate-based binding agent was prepared by emulsifying 0.5 parts of crude MDI containing an emulsifying agent into a solution of 9.2 parts of "Aerolite 300" a urea-formaldehyde resin glue ex Ciba-Geigy Ltd., supplied as a 65% solution, diluted with 8 parts of water containing 0.03 parts of dissolved ammonium sulphate in a "Silverson" mixer, i.e. equivalent to 6% urea-formaldehyde solids on the weight of dry wood chips. The crude MDI containing an emulsifying agent was prepared by stirring together and allowing to react 7 parts of methoxy polyethylene glycol (MWt 650) and 93 parts of crude MDI.

EXAMPLE 22

The procedure of Example 1 was repeated except that the metallic soap used was a 2% aqueous solution of potassium oleate and that instead of spraying the upper surface of the chip cake the upper press platen was sprayed.

CONTROL EXPERIMENTS

Example 1 was repeated except that no metallic soap was used. The pressed cake could not be released from the press plates without chiselling.

Example 1 was repeated except that in place of the metallic soap the following aqueous solutions were used in turn: 2% urea, 2% P.V. alcohol, 2% polyethylene glycol (MW 1000). 2% polyethylene glycol (MW 6000) 4% sodium silicate, 2% potassium octoate and 2% potassium acetate. In no case was the pressed cake easily and completely removed from the press.

DISCUSSION OF RESULTS

The compressed cakes produced in each of Examples 1-22 was released easily from the press compared with the cakes of the control experiments. In general, the release efficiency of the metallic soaps increased in the order aluminium stearates, calcium stearates, zinc stearate and iron stearate, iron stearate being the most effective.

I claim:

1. In a process for the manufacture of composite bodies or sheets comprising the steps of
   (a) mixing together a filler material and an isocyanate-based binding agent to form a mouldable composition;
   (b) introducing said composition to a mould and shaping said composition therein; and
   (c) thereafter releasing said shaped composition from said mould;
   the improvement which comprises providing a film of a metallic soap between said composition and said mould to assist release.

2. In a process for the manufacture of a composite sheet comprising the steps of
   (a) mixing together a lignocellulosic material and an isocyanate-based binding agent to form a compressible composition;
   (b) introducing said compressible composition between press platens;
   (c) compressing said composition at an elevated temperature to form a composite sheet; and
   (d) thereafter releasing said sheet from between said platens;
   the improvement which comprises providing a film of metallic soap between said composition and said platens to assist release.

3. A process according to claim 2 wherein the metallic soap is a metal salt of a long-chain fatty acid containing from 10 to 26 carbon atoms.

4. A process according to claim 3 wherein the metal salt is an alkaline earth or heavy metal salt.

5. A process according to claim 2 wherein the metallic soap is a metal stearate.

6. A process according to claim 2 wherein the metallic soap is selected from the group consisting of aluminium, calcium, zinc and iron stearates.

7. A process according to claim 2 wherein the metallic soap has a melting point less than the process temperature.

8. A process according to claim 2 wherein the composition is compressed between steel platens at a temperature of from 150° to 175° C and the metallic soap is an iron stearate.

9. A process according to claim 2 wherein the metallic soap is provided by applying an aqueous solution or dispersion of said metallic soap to said platens or to said composition prior to compression.

10. A process according to claim 9 wherein dissolved in an aqueous dispersion of an insoluble metallic soap is a soluble metallic soap.

11. A process according to claim 10 wherein the aqueous dispersion comprises approximately 5 parts of an insoluble metallic soap, 1 part of a soluble metallic soap and up to 150 parts of water.

12. A process according to claim 10 wherein the insoluble metallic soap is prepared by stirring together a soluble salt of a metal which forms an insoluble metallic soap to a solution of a soluble salt of a metallic soap.

13. A process according to claim 12 wherein the insoluble metallic soap is ferric oleate prepared by stirring a ferric chloride solution into a solution of a molar excess of a solution of potassium oleate.

14. A process according to claim 2 wherein in a first compression operation of a series of operations the metallic soap is applied to the press platen and thereafter for successive operations the metallic soap is applied at least in part to the composition.

* * * * *